July 21, 1953     B. R. THIELE     2,645,798
CARPET SWEEPER
Filed July 2, 1945     5 Sheets-Sheet 1
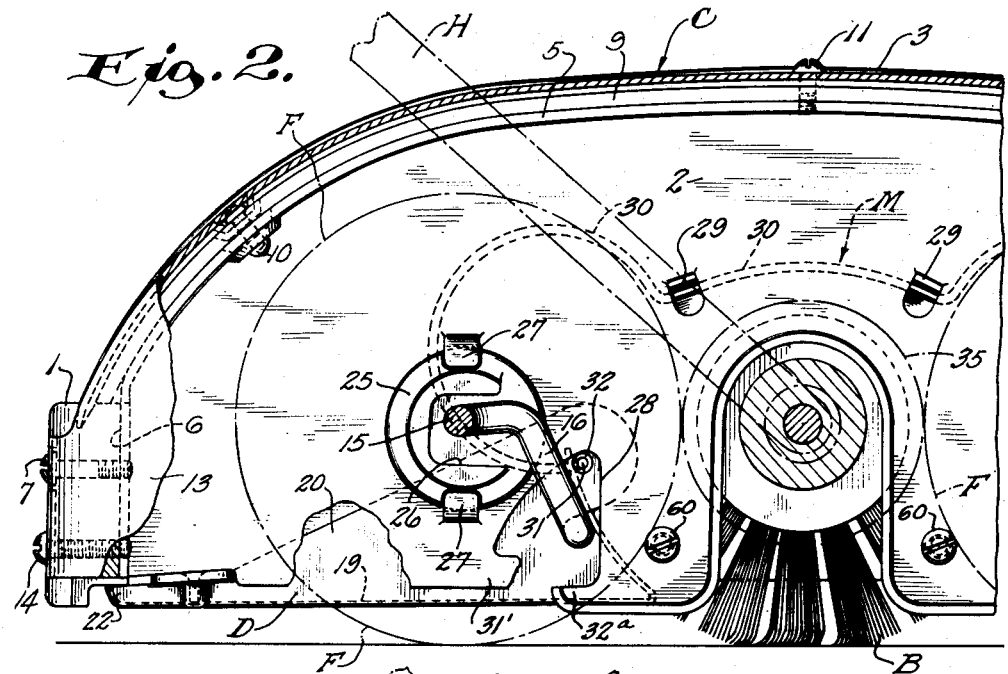
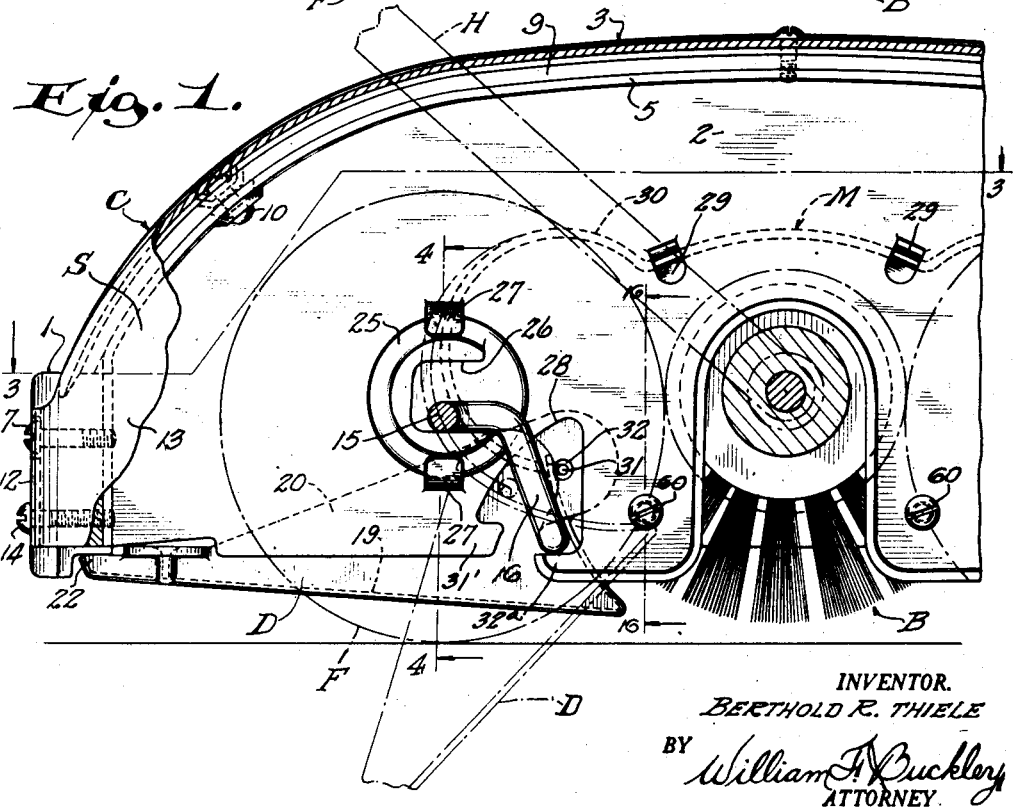
INVENTOR.
BERTHOLD R. THIELE
BY William F. Buckley
ATTORNEY July 21, 1953.  B. R. THIELE  2,645,798
CARPET SWEEPER
Filed July 2, 1945  5 Sheets-Sheet 2
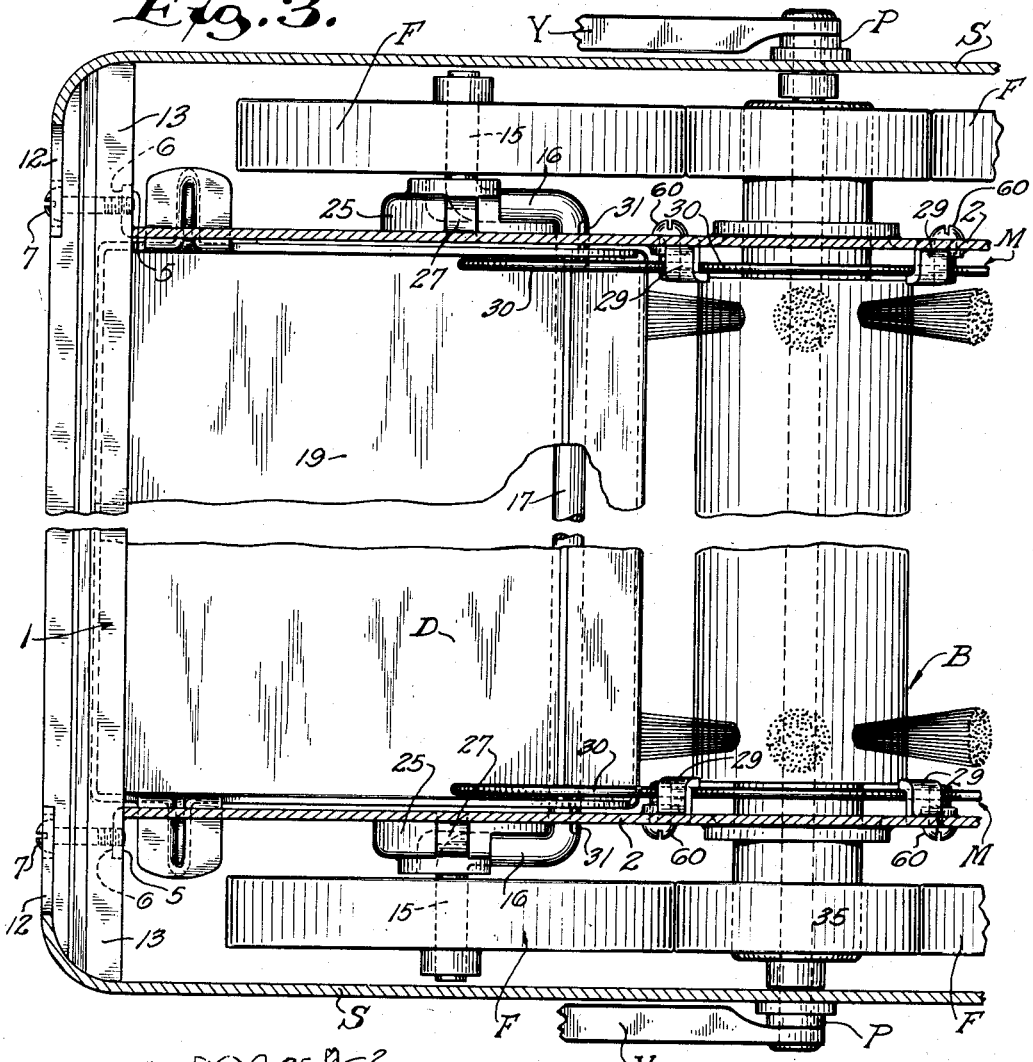
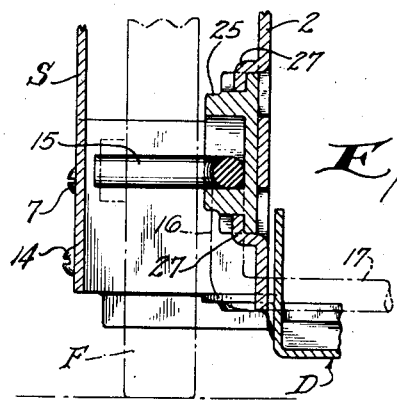
INVENTOR.
BERTHOLD R. THIELE.
BY William F. Buckley
ATTORNEY July 21, 1953
B. R. THIELE
2,645,798
CARPET SWEEPER
Filed July 2, 1945
5 Sheets-Sheet 3
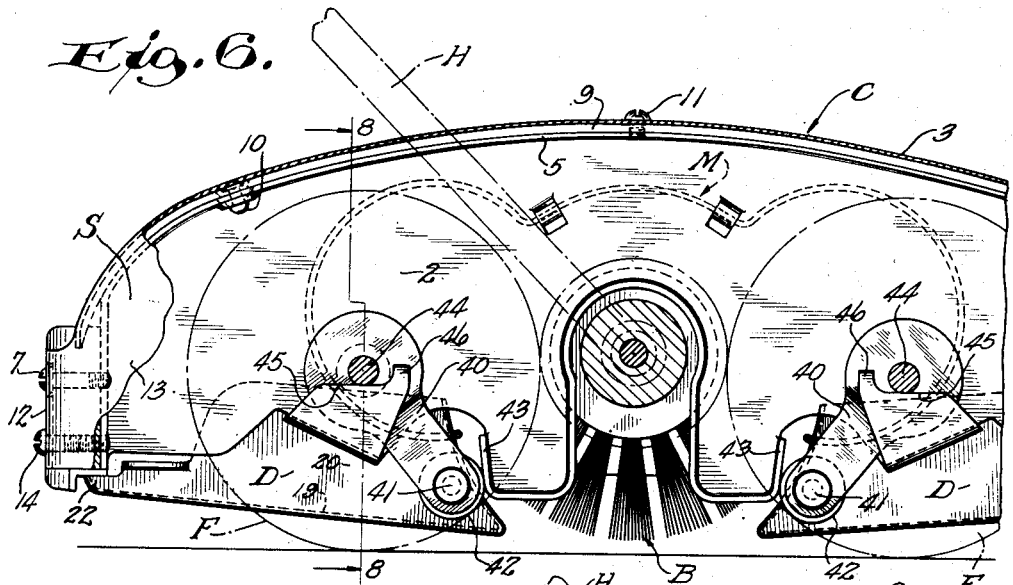
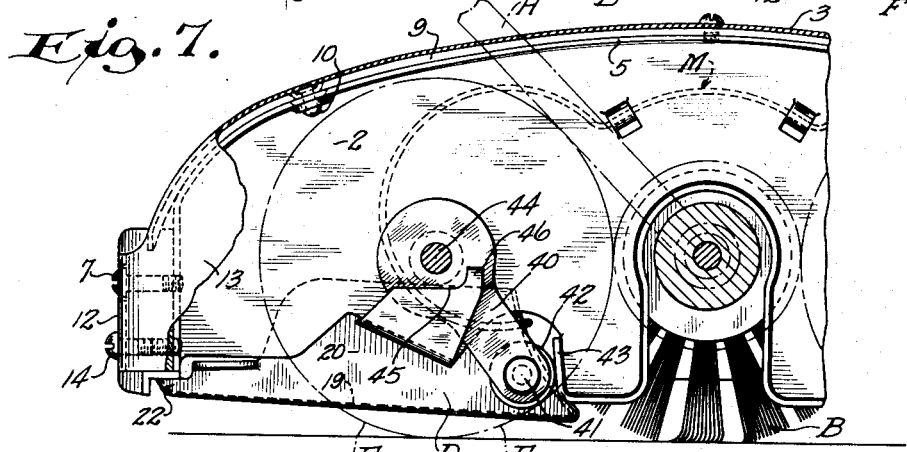
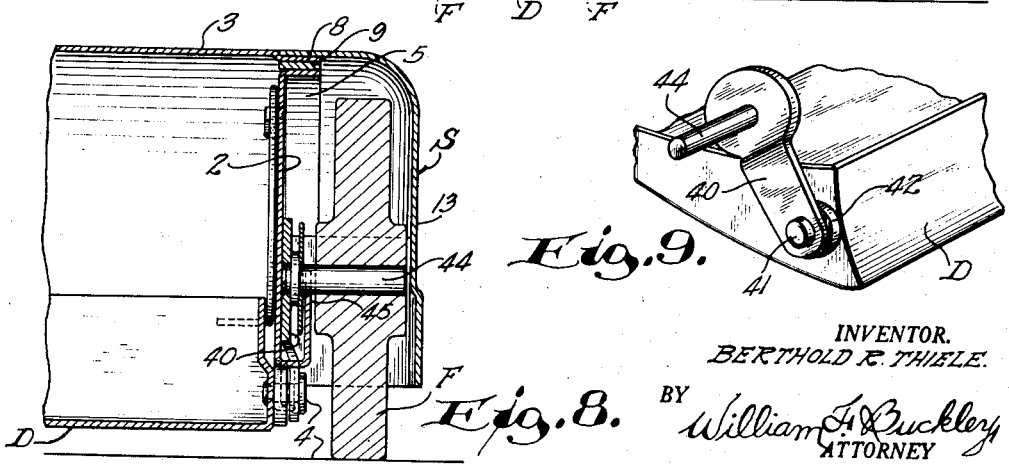
INVENTOR.
BERTHOLD R. THIELE.
BY William F. Buckley
ATTORNEY July 21, 1953  B. R. THIELE  2,645,798
CARPET SWEEPER
Filed July 2, 1945  5 Sheets-Sheet 4
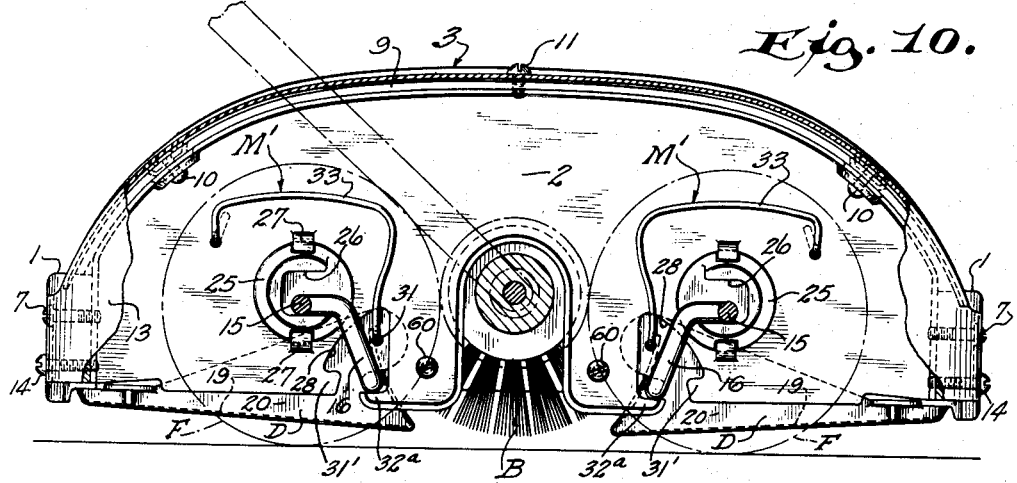
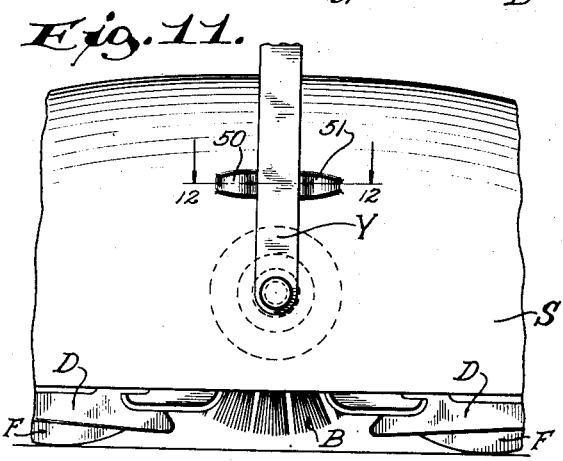
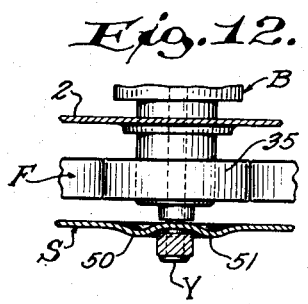
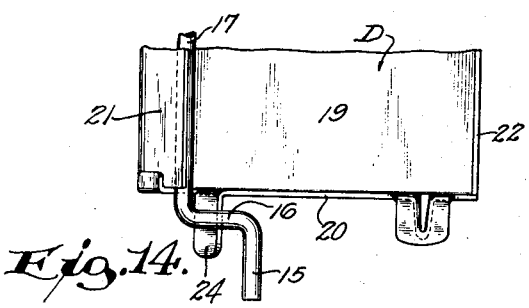
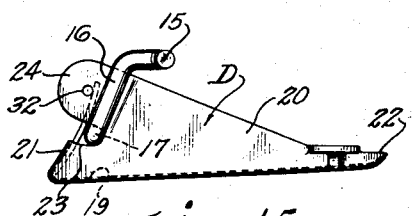
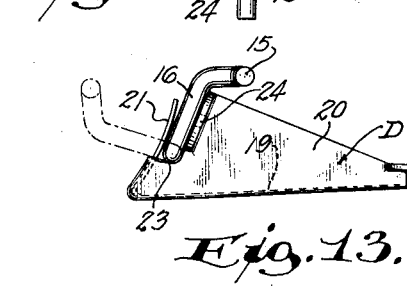
INVENTOR.
BERTHOLD R. THIELE
BY William F. Buckley
ATTORNEY.

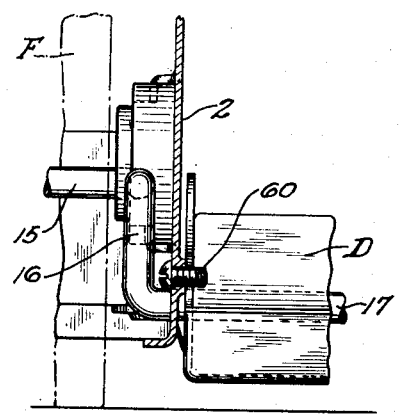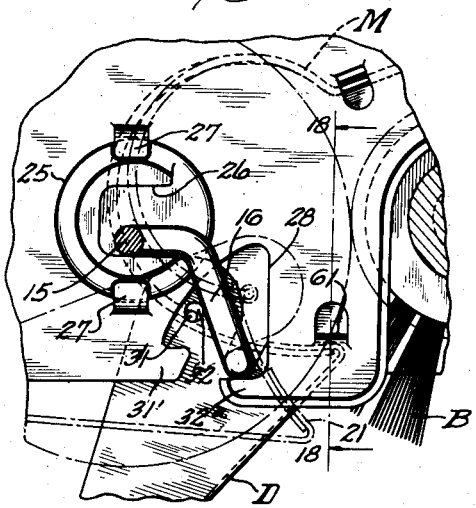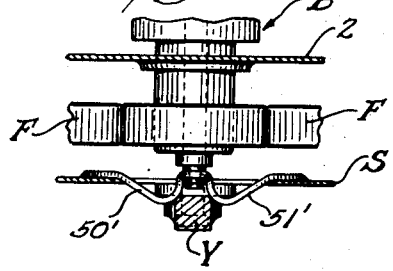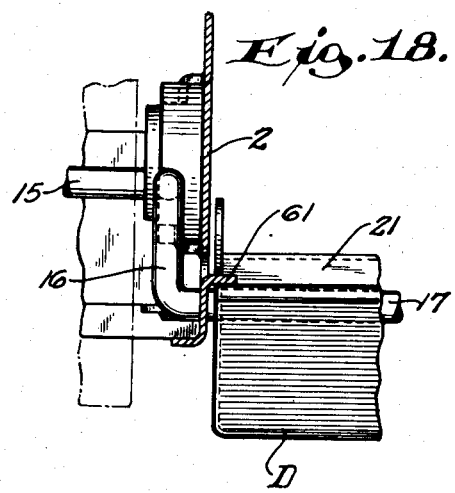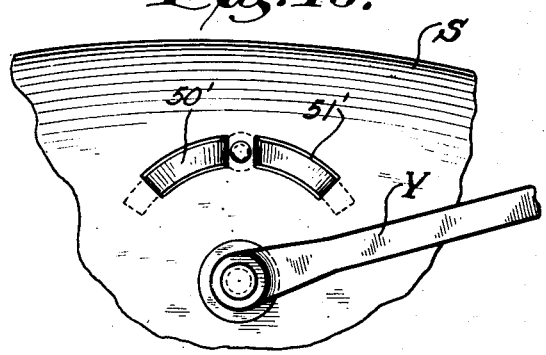

Patented July 21, 1953

2,645,798

UNITED STATES PATENT OFFICE 2,645,798

CARPET SWEEPER

Berthold R. Thiele, Ripon, Wis., assignor to Speed Queen Corporation, a corporation of Delaware Application July 2, 1945, Serial No. 602,746

8 Claims. (Cl. 15—41)

This invention relates to an improvement in carpet sweepers.

An object of the invention is to provide a carpet sweeper of extremely simple, compact and closely organized construction, one which may be readily manufactured with economy from materials and by means of facilities readily available and which is easy to assemble and dis-assemble. The construction is such that the different instrumentalities of the sweeper may be fabricated as sub-assemblies adapted to be put together also dis-assembled as units with the advantage that an access may be had to closely inter-related groups of the elements for the purpose of cleaning, lubrication, replacement, or repair without requiring complete dis-assembling of the sweeper construction.

Another and important object of the invention is to provide a carpet sweeper having the advantages and capacities mentioned and one wherein a single element serves as a pivot shaft for each dust pan and also as the stub axles for a pair of floor wheels. These parts are so especially designed and adapted and are so especially combined with spring means that the same spring means which is effective to close the pans and maintain them closed also supplies the force which urges the floor wheels into driving contact with the brush pulleys. This same organization is so especially contrived that the dust pans are automatically maintained at all times in the most advantageous and efficient vertical relation to the floor or surface being swept.

These objects of the invention and other ancillary advantages are attained by the mechanism, construction, and arrangement illustrated in the accompanying drawings forming part hereof, in which:

Fig. 1 is a fragmentary view partly in end elevation and partly in longitudinal vertical cross section, the end shell of the sweeper that is viewed being broken away to illustrate the manner in which the wheel action is co-ordinated with the dust pan action, the pans and wheels being shown in the position when no pressure is applied to the handle;

Fig. 2 is a view similar to Figure 1 but illustrating the wheels and pans as positioned when pressure is applied to the handle of the sweeper;

Fig. 3 is a fragmentary view in top plan showing half of a sweeper embodying the present invention with the cover removed and parts shown in horizontal cross section for the sake of illustration;

Fig. 4 is a fragmentary view in vertical cross section taken on line 4—4 of Figure 1;

Fig. 5 is a fragmentary view in side elevation to illustrate the manner in which each end shell is releasably attached to a side rail of the sweeper;

Fig. 6 is a view in end elevation of modified form of a sweeper embodying the present invention, the end shell being broken away for the sake of illustration, and the dust pans being shown in a position where no pressure is applied to the handle of the sweeper;

Fig. 7 is a fragmentary view similar to Figure 6, but showing the dust pans as positioned, in this embodiment of the invention, where pressure is applied to the handle of the sweeper;

Fig. 8 is a fragmentary view taken in vertical cross section on line 8—8 of Figure 6;

Fig. 9 is a fragmentary perspective view of a portion of the dust pan and of the linkage and stub axle employed in the embodiment of the invention shown in Figures 6, 7, and 8;

Fig. 10 is a view partly in end elevation and partly in longitudinal vertical cross section of another modified form of a sweeper embodying the present invention, the end shell of the sweeper that is viewed being broken away to illustrate the manner in which the wheel action in this form of the invention is co-ordinated with the action of the dust pans;

Fig. 11 is a fragmentary view in end elevation to illustrate the manner in which the bail of the handle is combined with resilient projections on the end shells of the sweeper for the purpose of maintaining the bail of the handle in upright position and also for the purpose of stabilizing the action of the sweeper when it is in use;

Fig. 12 is a fragmentary view in horizontal cross section taken on line 12—12 of Figure 11;

Fig. 13 is a detail view in end elevation illustrating the manner in which the combination pivot shaft of each dust pan and its associated stub axles are assembled with their respective dust pans;

Fig. 14 is a plan view of the structure illustrated in Figure 13 and showing the same, as in Figure 13, prior to complete assembly;

Fig. 15 is a view in end elevation showing the complete assembly of the pivot shaft, stub axles, and dust pan, Fig. 16 is a view partly in elevation and partly in vertical cross section to illustrate the manner in which the stop screws or studs coact with the dirt retaining flanges of the dust pans to limit their opening movement;

Fig. 17 is a fragmentary view partly in elevation and partly in vertical section to illustrate the means by which and the manner in which the structural formations of the arrow shaped openings limits the movement of the corners of the dust pan towards the brush;

Fig. 18 is a fragmentary view similar to Figure 16 but showing a variation of the means for limiting the opening movement of the dust pans:

Fig. 19 is a fragmentary view in elevation showing a modified form of the means which may be employed to control the position of the bail and handle and to stabilize sweeper when it is in operation; and, Fig. 20 is a view partly in top plan and partly in horizontal cross section of the structure shown in Figure 19 and illustrating how one arm of the bail may be releasably retained to hold the bail and handle in upright position.

GENERAL CONSTRUCTION

Referring to the drawings it will be seen in all embodiments of the invention the sweeper comprises generally a casing designated as a whole at C, floor wheels F, rotary brush B, dust pans D, end shells S, and a handle H having a bail or yoke Y straddling the end shells S and pivotally inter-connected therewith as at P.

CASING CONSTRUCTION

The casing construction is the same in all embodiments of the invention. It comprises two side rails 1, preferably of wood, two end walls 2, preferably constituted of sheet metal stampings, and a cover 3, preferably of metal, but of course, any suitable material may be employed. The end shells S are combined with the side rails 1, the end walls 2, and the cover 3 to complete the casing of the sweeper. The end walls 2 are provided along their upper edges and their downwardly curved sides with outwardly projecting marginal flanges 5. The side rails 1 have recesses 6 which accommodate the lower portions of these flanges 5. Screws 7 are provided to releasably attach the side rails 1 to the flanges 5 of the end walls 2. In lieu of the screws 7, rivets may be employed, as this point of attachment is relatively permanent in its nature. The margins of the cover are offset downwardly as shown at 8 in Figure 8 and rest against filler strips 9 interposed between these marginal edges 8 and the flanges 5. The inner marginal edges of the end shells S overlap and snugly fit against the downwardly offset marginal edges 8 of the cover 3.

The cover 3 is securely and preferably permanently fastened to the end walls 2. For this purpose a fastening device, such as a rivet 10 is utilized to inter-connect each downwardly offset margin 8 of the cover with the underlying flange 5 of each end wall 2 at a point intermediate the center and each side rail 1 of the casing. These rivets 10 are countersunk or received in depressions provided therefor in the margins 8 of the cover 3 so as not to interfere with the snug, flush fit of the inner marginal edges of the end shells S with the downwardly offset edges of the cover 3, and to provide a merging or blending of these parts into each other with the appearance or visual effect of a unitary structural integrity.

The end shells S, however, are removably attached to the cover 3 and the side rails 1. A single screw 11, provided at the center of the top at each end of the casing C releasably secures the cover 3 to the adjacent end shell S and to the flange 5 of the adjacent end wall 2. At the four corners of the casing C, portions 12 of the end shells S overlap extensions 13 of the side rails 1. The extensions 13 of the side rails 1 project beyond the end walls 2. A screw 14 at each corner of the casing releasably secures the adjacent overlapping portion 12 of each end shell to the adjacent extension 13 of the side rail, and to the flanges 5 of the end walls. The screws 7, 11 and 14 may be self-tapping screws making their own threads in the flanges 5 of the end walls 2. Of course, if desired, ordinary screws may be used and equipped with nuts, bolts and washers at their inner ends.

This organization makes it practical to sub-assemble the side rails 1, end walls 2, and cover 3 permanently. To further assemble the sweeper or dis-assemble it for cleaning, replacement, lubrication, or repair, only three screws must be removed or applied at each end, namely one screw 11 and two screws 14.

*Floor wheel, brush, and dust pan co-ordinating mechanism*

It has been found to be very advantageous from the standpoints of improved sweeping function, decreased fabricating costs, and ease of maintenance, to form the floor wheels and dust pans for each side of the sweeper in separate sub-assemblies. These sub-assemblies are detachably and floatably mounted in the sweeper casing. The use of these sub-assemblies substantially reduces the fabricating and assembling costs over that of conventional sweepers. The ease of disassembling and reassembling the sub-assemblies greatly simplifies maintenance of the sweeper.

In order to insure proper driving engagement of the wheels with the brush, the wheels should be biased into engagement with the brush drive. Also, the dust pans preferably are biased about their pivotal supports either into the open or closed position as desired. For best results the casing should be biased upwardly relative to the support wheels so the sweeping action can be controlled by pressure upon the sweeper handle. The employment of the dust pan and wheel support sub-assemblies makes practical the performance of all three of the above biasing functions by the use of a single spring or a single set of springs with all the springs constructed and functioning alike.

As provided by the invention, the floor wheels and dust pans are pivoted about substantially parallel but offset axes in the sub-assemblies. This offset position of the axes facilitates the use of relatively large floor wheels with low slung dust pans closely positioned relative to the sweeper brush. The use of this type of dust pan enhances the sweeping operation as will presently appear. To prevent damage to the brush when the dust pans are opened, the pans should be pivoted as closely as possible to the brush. It has been found that the brush is best driven by floor wheels of substantial size. To accommodate the relatively large radii of these floor wheels, it is desirable to journal them about axles offset from the pivotal axes of the dust pans and preferably above the latter axes.

The floor wheels F, of course, roll over the floor or surface being swept. Each pair of floor wheels is journaled on stub axles 15 which are formed as integral extensions of cranks or links 16, also integral with a through-going shaft 17. Each shaft 17 is rotatably mounted in bearing openings provided therefor in the side flanges of the associated dust pan and is also accommodated in arrow shaped openings 28 fashioned in the end walls of the casing of the sweeper.

The dust pans D (see Figures 13, 14 and 15) are constituted of sheet metal stampings and each comprises a bottom 19, side flanges 20, a sloping dirt retaining flange 21 and a slightly flanged or rolled end 22 adapted for engagement with the side rails 1. The end flanges 20 have bearing openings through which shaft 17 extends thereby to mount the pans for pivotal movement. (See the full and dotted line showing in Figure 1.)

It will be noted that the floating links enable the dust pans to be pivotally supported in close proximity to the brush as illustrated in Fig. 2. Pans with protruding "heels" having sloping dirt retaining flanges 21 thereon may be located virtually underneath the brush. This position of the pan increases the efficiency of the sweeper by catching a larger percentage of the dust particles swept from the floor by the brush. The space between the upper edge of the retaining flange and the brush through which the dirt may fall back to the floor is reduced to a minimum. The sloping dirt retaining flanges of the preferred form (of pans) provide narrow chutes between the surface of the brush and the retaining flanges. The air currents excited by the brush travel up these chutes and are sufficient to blow a substantial portion of the dust particles which drop from the brush up over the flange and into the pans.

It is highly advantageous to pivot the dust pans to the floating support at points as low and close to the brush as possible so that "digging in" of the heels of the pans into the brush when the pans are opened is reduced to a minimum. The offset axes for the floor wheels and dust pans, provided by the invention, facilitate this advantageous location of the dust pan pivots.

Each shaft 17, together with its cranks 16 and stub axles 15 is sub-assembled in a novel and special way with its dust pan. To provide for this special sub-assembly the end flanges 20 are notched as at 23 and provided with tabs or extensions 24. Figures 13 and 14 illustrate the initial phase of the assembling operation wherein the tabs 24 are bent outwardly or laterally so that the shaft 17 may be dropped into the notches 23. With the shaft 17 in place, the cranks 16 are rotated downwardly to allow the tabs 24 to be bent back to the position shown in Figure 15 so as to confine the shaft in its bearing openings. In the forms of the invention shown in Figures 1 to 5 and 10, slotted guide blocks 25 are fixed to the end walls 2 and coact with the inner portions of the stub axles 15 to limit their upward and downward movement. The guide blocks 25 may be constituted of metal, plastic or any suitable material. The guiding slots or tracks 26 of the blocks 25 are U-shaped and open toward the brush. Lugs 27 which may be struck from the end walls 2 and clinched over the upper and lower portions of each block are one convenient means for securing the blocks in place. In lieu of the lugs 27, screws, rivets, welds or any other suitable type of fastening device may be employed.

The sub-assembly of each shaft 17 and dust pan D may be readily and easily assembled with the casing and the guide block 25 by virtue of the provision of arrow shaped openings 28 in the end walls 2 of the casing. When this assembly has been completed spring means designated at M in Figures 1, 2, 3, 6 and 17 and at M¹ in Figure 10 is attached to the end walls 2 of the casing and to the tabs 24 of the dust pans D. The spring means M and M¹ both function in the same way. They differ only in structure or design. In the form shown in Figures 1, 2, 3, 6 and 17, a single spring 30 is attached as at 29 to each end wall 2 of the casing and has its inwardly offset ends 31 inserted in openings 32 provided in the adjacent tabs 24 of the dust pans so as to be attached also to the pans. In the form shown in Figure 10, an individual spring 33 is provided for each dust pan. When assembled, the springs, in both forms are tensioned and press inwardly and downwardly at an angle of approximately 45°. The springs serve to bias the pans to closed position and also, since the pans are interconnected to the floor wheels through the shafts 17, cranks 16 and stub axles 15, to force the floor wheels into driving contact with the pulleys of the brush B.

Means is provided for limiting or stopping the opening movement of the dust pans D. This means may take or be embodied in several different forms.

For example, in the form of the invention shown in Figures 1, 2, 3 and 16, stop screws or studs 60 are threadedly or otherwise suitably mounted on the end walls 2 and project inwardly therefrom in position to engage the lower corner of the dust or dirt retaining flange 21 of each dust pan D. (See the dotted line illustration in Figure 1.)

The same effect may be had by stamping or striking lugs 61 from the end walls as illustrated in Figures 17 and 18, the lugs 61 being merely a structural variant of the screws or studs 60.

Depending upon the position of the screws or studs 60 and likewise upon the position of the lugs 61, the dust pans D will, when manually opened, remain in open position until manually closed, or will automatically snap back to closed position when released.

If the screws 60 and the lugs 61 are omitted, the limiting or stopping effect may be had by means of the coaction of the offset ends 31 of the springs with the lips 31¹ of the arrow-shaped opening 28 of the end walls 2.

Obvious, whatever stop structure is used, the pan will remain open or will be automatically closed depending upon whether, in the opening movement of the pan, the ends 31 of the springs M cross or do not cross a line extending from the upper anchor point of the spring through the center of shaft 17.

Means is also provided for limiting the movement of the dust pans D toward the brush B, when the pans are opened, for the purpose of preventing the lower corners of the dirt retaining flanges of the dust pans from dipping or striking too deeply into the tufts or bristles of the brush B and possibly damaging them. This is accomplished by forming the arrow-shaped openings 28 with a second flange formation 32ª on which the shafts 17 ride and with the corners of which it abuts to limit movement toward the brush.

A third function is also imposed upon these arrow-shaped openings and the structure organized therewith and that is to keep the pan and shaft assembly assembled to the sweeper case before the brush is assembled or when the brush is taken out for replacement or cleaning.

Finally the flange 32ª on which the shaft 17 rests or rides serves the purpose, when no pressure is applied to the sweeper, to limit downward movement of the pans so that their initial height is always the same. Obviously, there is no hindrance to their upward movement by this structure. It is apparent that the offset location of the dust pan pivots allows the floating dust pan and wheel support sub-assembly to be pivotally supported nearer to the edge of the casing than would be feasible without the offset provision. This permits the arrow-shaped support openings to be made shorter, thereby increasing the rigidity of the casing.

Figures 6, 7, 8 and 9 illustrate a modification of the invention. In this form of the invention the main casing, the dust pan, the axles, the brush, are all the same as those previously described. The difference in the two embodiments resides in the way of linking or inter-connecting the dust pans D to the floor wheels F. Instead of utilizing combination pivot shafts and stub axles, links 40 are employed. There is one such link 40 between each brush adjacent corner of each dust pan and each stub axle for each wheel. Each link 40 has a pivotal connection 41 between its lower end and its dust pan. Rotatable around each pivot connection 41 is a roller 42, which rides against a flange 43 formed on the adjacent part of each end wall of the casing. At its opposite end each link 40 has a stub axle 44 supporting its floor wheel F and riding on a track 45 provided by reversely folding the adjacent part of the end wall in the manner illustrated in Figures 6, 7 and 8. The track 45 is flanged to provide a bumper or stop flange 46 to keep each stub axle on its track.

Figures 11 and 12 illustrate a refinement of the invention which may be common to all forms. It comprises simply the provision of means to maintain the handle and bail in upright position when the sweeper is not in use and to stabilize the sweeper when it is in use. This means is constituted of two projections 50 and 51 which may be pressed or stamped out of the end shells S of the casing and located symmetrically with respect to the brush axis. As illustrated in Figure 11, when the arms of the bail of the handle are vertical, they are located between the projections 50 and 51 and are releasably maintained in this position. The end shells are as described, constituted of resilient metal, so that they are springy in character. The projections 50 and 51 are illustrated in contour in Figure 12. Their adjacent edges slope towards each other and they slope outwardly also at a slight angle from the mean plane of the end shell of which they are formed. This formation or contour gives them the capacity to releasably maintain the arms of the bail in vertical position when the sweeper is not in use. However, it is easy to shift the handle H of the sweeper and its bail Y to a position for sweeping. When the sweeper is in use the interengagement of the arms of the bail Y with the projections 50 and 51 stabilizes the action of the sweeper.

The projections for holding the bail and handle in upright position and for stabilizing the sweeper when in operation may also take the form illustrated in Figures 19 and 20. As there shown, a strip-like piece of spring or resilient metal adjacent each end wall is sinuously or reversely bent to provide projections $50^1$ and $51^1$ and has its ends inserted in slots in the end walls 2 and its central portion riveted to the end walls.

It has been mentioned that the bail or yoke Y straddling the end shells S is pivotally connected with these shells. The pivot pins or studs which provide this pivotal interconnection may also be and preferably are sufficiently elongated to provide trunnions for the bearing openings formed in the ends of the body of the brush.

While I have shown and described several constructions in which the invention may be advantageously embodied, it is to be understood that the constructions shown here have been selected merely for the purpose of illustration or example, and that various changes in the size, shape, and arrangement of the parts may be made without departing from the spirit of the invention or the scope of the subjoined claims.

Subject matter similar to subject matter disclosed but not claimed herein is included in my two copending applications Serial Nos. 230,130 and 230,131, both filed June 6, 1951.

What I claim is:

1. A carpet sweeper comprising, in combination, a casing, a sweeper brush rotatably mounted in said casing, driving pulleys on said brush, two pairs of axles floatingly disposed in said casing on opposite sides of said brush for free movement transversely of said axles relative to the casing, floor wheels journaled on said axles in driving engagement with said pulleys, track means on said casing disposed in position to limit downward movement of said wheels relative thereto, two dust pans disposed in said casing on opposite sides of said brush, two transverse pivotal supports for said respective pans disposed in offset relation respectively to the contiguous pair of said pairs of axles and floatingly disposed in said casing for movement transversely of said supports relative to said casing, guide means on said casing arranged to limit horizontal movement of said respective pan pivotal supports toward said brush and at the same time permit vertical movement of said pan pivotal supports, laterally extending floating links interconnecting respective ones of said wheel axles with the adjacent one of said pan pivotal supports, resilient spring means interconnected between said casing and said respective pans at points on the latter offset from said respective pan pivotal supports, said spring means being arranged and stressed to exert forces on said respective pans having force components acting downwardly and horizontally toward said brush; and said spring means and the aforementioned floating elements serving to provide a floating support for said casing, to hold said respective pans in closed position, and to maintain said wheels in frictional engagement with said pulleys.

2. The sweeper set forth in claim 1 in which the floating interconnecting links are independent of each other, and said casing has integral upturned flanges constituting the track means for each stubshaft axle, and a roller provided at the pivot point of each interconnecting link with its respective dust pan, said rollers engaging flanges on said casing constituting the guide means to facilitate the floating movement of said dust pans relative to said casing.

3. The sweeper of claim 1 further characterized by the provision of rollers at the pivotal supports of said dust pans on said floating links, said rollers riding upon flanges provided upon said casing and constituting the guide means, whereby to lessen frictional forces between said dust pan assemblies and said casing upon movement of said dust pans and wheel supports relative to said casing.

4. A carpet sweeper having a casing, a rotating brush and brush pulleys therefor supported on said casing, two dust pans pivotally supported respectively at opposite sides of said brush in close proximity thereto, the side of each dust pan adjacent said brush having a contour corresponding to that segment of the brush surface nearest thereto, the pivotal support for each dust pan being in close proximity to said brush, said pivotal supports being mounted on floating links the upper ends of which are associated with horizontal guides which limit in at least one direction the vertical movements of these ends, a protruding stubshaft on the upper end of each floating link to serve as an axle, said pivotal supports and said stubshafts being laterally offset from each other, a support wheel mounted on each axle, a resilient spring interconnecting said dust pans, said spring reacting on said pans at points offset from said pivotal supports, and serving to bias said dust pans about their pivotal supports normally into closed positions and to react through said dust pans and said floating links to bias said wheels into operative engagement with said brush pulleys and downwardly to have engagement with the surface to be swept.

5. A carpet sweeper comprising, in combination, a casing, two dust pan and wheel support sub-assemblies for said casing, each of said sub-assemblies including a dust pan and a pivot shaft extending therethrough, two laterally extending crank arms operatively connected to the respective ends of said pivot shaft, a stubshaft at the end of each of said crank arms and serving as a wheel axle, and support wheels on each of the axles thus formed; said sweeper casing having openings extending inwardly from the edges thereof, said sub-assemblies being detachably assembled with said casing with said pivot shafts disposed in the respective openings in said casing.

6. The carpet sweeper of claim 5 having a flange on said casing at a margin of each of said openings, said flanges extending crosswise of said respective pivot shafts to maintain said sub-assemblies in assembled position.

7. The carpet sweeper of claim 6 further characterized by spring means interconnecting said dust pan sub-assemblies, said spring means exerting biasing force on said sub-assemblies to maintain said pivot shafts in positions in said openings in said casing to cooperate with said flanges in maintaining said pivot shafts in said openings.

8. A wheel support and dust pan sub-assembly for a carpet sweeper including a dust pan having bearing notches in opposite ends, a pivot shaft extending across said dust pan and being slidable into said bearing notches, a retaining tab associated with each of said notches, said tabs being bendable into two positions to respectively permit said pivot shaft to be slid into said notches and to retain said shaft in said notches, said pivot shaft having a crank arm at each end, each crank arm having a stubshaft extending therefrom to serve as a wheel axle, and said stubshafts being substantially parallel to and laterally offset from said pivot shaft.

BERTHOLD R. THIELE.

References Cited in the file of this patent

UNITED STATES PATENTS

| Number | Name | Date |
|---|---|---|
| 412,219 | Gates | Oct. 1, 1889 |
| 449,541 | Kelley | Mar. 31, 1891 |
| 466,721 | Drew | Jan. 5, 1892 |
| 487,212 | Drew | Nov. 29, 1892 |
| 576,837 | Drew | Feb. 9, 1897 |
| 933,893 | Deacon | Sept. 14, 1909 |
| 1,236,122 | Suttle | Aug. 7, 1917 |
| 1,407,676 | Roth | Feb. 21, 1922 |
| 1,596,550 | Owen | Aug. 17, 1926 |
| 1,845,057 | Owen | Feb. 16, 1932 |
| 1,937,589 | Pullen | Dec. 5, 1933 |
| 1,937,590 | Pullen | Dec. 5, 1933 |
| 2,166,977 | Smith | July 25, 1939 |
| 2,228,528 | Miller | Jan. 14, 1941 |
| 2,235,432 | Kenyon | Mar. 18, 1941 |